US012795404B2

(12) United States Patent
Ryu et al.

(10) Patent No.: US 12,795,404 B2
(45) Date of Patent: Nov. 10, 2026

(54) ON-DEMAND SYSTEM INFORMATION UPDATE

(71) Applicant: QUALCOMM Incorporated, San Diego, CA (US)

(72) Inventors: Jae Ho Ryu, San Diego, CA (US); Hung Dinh Ly, San Diego, CA (US); Changhwan Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 272 days.

(21) Appl. No.: 18/626,214

(22) Filed: Apr. 3, 2024

(65) Prior Publication Data

US 2025/0317752 A1 Oct. 9, 2025

(51) Int. Cl.

*H04W 24/02* (2009.01)
*H04W 68/02* (2009.01)
*H04W 72/232* (2023.01)

(52) U.S. Cl.

CPC ........... *H04W 24/02* (2013.01); *H04W 68/02* (2013.01); *H04W 72/232* (2023.01)

(58) Field of Classification Search

CPC ..... H04W 24/02; H04W 48/08; H04W 68/02; H04W 72/232

See application file for complete search history.

(56) References Cited

U.S. PATENT DOCUMENTS

2021/0037455 A1* 2/2021 Zhu ........................ H04W 76/27
2024/0243869 A1* 7/2024 Wang .................... H04L 5/0094

FOREIGN PATENT DOCUMENTS

WO WO-2025171877 A1 * 8/2025 .......... H04W 52/028

OTHER PUBLICATIONS

Gaal P (Qualcomm Incorporated)., et al., "On-Demand SIB1 Procedure", 3GPP TSG RAN WG1 #116, R1-2401450, Type Discussion, NETW_Energy_NR_ENH-Core, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2024-Mar. 1, 2024, 6 Pages, Feb. 18, 2024, XP052569210, paragraph [0001]-paragraph [0007], figure 2.

International Search Report and Written Opinion—PCT/US2025/018304—ISA/EPO—Jun. 11, 2025.

(Continued)

*Primary Examiner* — Zhensheng Zhang
(74) *Attorney, Agent, or Firm* — Harrity & Harrity LLP

(57) ABSTRACT

Various aspects of the present disclosure generally relate to wireless communication. Some aspects provide indication of an update relating to an on-demand (OD) system information block (SIB), such as OD-SIB1, for an anchor cell and a plurality of non-anchor cells. Some aspects more specifically relate to indication on an anchor cell of an update to a non-anchor cell's OD-SIB or configuration relating to OD-SIB1. In some aspects, a user equipment (UE) may receive, from an anchor cell on a first carrier frequency, an indication of an update associated with an OD-SIB for a non-anchor cell on a second carrier frequency. The UE may obtain the update in accordance with the indication. Thus, the UE can be indicated of an update associated with an OD-SIB of a non-anchor cell while the UE is camped on an anchor cell (and not the non-anchor cell).

30 Claims, 10 Drawing Sheets

(56) References Cited

OTHER PUBLICATIONS

Nimbalker A(Ericsson)., et al., “Study of On-demand SIB1 for UEs in Idle/inactive Mode for NES”, 3GPP TSG RAN WG1#116, R1-2401144, Type Discussion, NETW_Energy_NR_ENH-Core, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2024-Mar. 1, 2024, pp. 1-8, Feb. 19, 2024, XP052568915, p. 5, figure 4.

Zeng W (Apple)., et al., “On On-demand SIB1 for Idle/Inactive mode UEs”, 3GPP TSG RAN WG1 #116, R1-2401021, Type Discussion, NETW_Energy_NR_ENH-Core, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2024-Mar. 1, 2024, 6 Pages, Feb. 19, 2024, XP052568792, p. 3, figure 4.

* cited by examiner

ON-DEMAND SYSTEM INFORMATION UPDATE

FIELD OF THE DISCLOSURE

Aspects of the present disclosure generally relate to wireless communication and specifically relate to techniques, apparatuses, and methods associated with on-demand system information updating.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

A user equipment (UE) may operate in an idle or inactive mode in which a radio resource control (RRC) connection with a wireless network is inactive, suspended, or not established. The UE may select a suitable cell on which to register (referred to as "camping"). From the idle or inactive mode, the UE may enter a connected mode and may connect to the cell on which the UE is registered. When registered or camped on a cell, the UE can receive system information for the cell and can initiate an RRC connection establishment on the camped cell.

In some examples, a network node (such as a gNB) may provide an anchor cell and one or more non-anchor cells. The anchor cell may provide coverage for both legacy UEs (that is, UEs that support communication only on the anchor cell) and UEs supporting the one or more non-anchor cells. In some aspects, the one or more non-anchor cells may support transmission of on-demand (OD) system information, such as an OD system information block (SIB). OD SIBs may differ from other SIBs in that OD SIBs may be transmitted in response to a trigger such as an uplink wakeup signal or a condition being satisfied, whereas other SIBs (such as a non-OD-SIB1) may be transmitted periodically.

SUMMARY

In some aspects, a method of wireless communication performed by a user equipment (UE) includes receiving, from an anchor cell on a first carrier frequency, an indication of an update associated with an on-demand system information block (OD-SIB) for a non-anchor cell on a second carrier frequency, wherein the non-anchor cell is associated with the anchor cell. The method may include obtaining the update associated with the OD-SIB in accordance with the indication.

In some aspects, a method of wireless communication performed by a network node includes transmitting, via an anchor cell on a first carrier frequency, an indication of an update associated with an OD-SIB for a non-anchor cell on a second carrier frequency, wherein the non-anchor cell is associated with the anchor cell. The method may include transmitting the update associated with the OD-SIB in accordance with the indication.

In some aspects, a UE for wireless communication includes a processing system that includes one or more processors and one or more memories coupled with the one or more processors. The processing system may be configured to cause the UE to receive, from an anchor cell on a first carrier frequency, an indication of an update associated with an OD-SIB for a non-anchor cell on a second carrier frequency, wherein the non-anchor cell is associated with the anchor cell. The processing system may be configured to cause the UE to obtain the update associated with the OD-SIB in accordance with the indication.

In some aspects, a network node for wireless communication includes a processing system that includes one or more processors and one or more memories coupled with the one or more processors. The processing system may be configured to cause the network node to transmit, via an anchor cell on a first carrier frequency, an indication of an update associated with an OD-SIB for a non-anchor cell on a second carrier frequency, wherein the non-anchor cell is associated with the anchor cell. The processing system may be configured to cause the network node to transmit the update associated with the OD-SIB in accordance with the indication.

In some aspects, a non-transitory computer-readable medium storing a set of instructions for wireless communication includes one or more instructions that, when executed by one or more processors of a UE, cause the UE to: receive, from an anchor cell on a first carrier frequency, an indication of an update associated with an OD-SIB for a non-anchor cell on a second carrier frequency, wherein the non-anchor cell is associated with the anchor cell. The one or more instructions may cause the UE to obtain the update associated with the OD-SIB in accordance with the indication.

In some aspects, a non-transitory computer-readable medium storing a set of instructions for wireless communication includes one or more instructions that, when executed by one or more processors of a network node, cause the network node to transmit, via an anchor cell on a first carrier frequency, an indication of an update associated with an OD-SIB for a non-anchor cell on a second carrier frequency, wherein the non-anchor cell is associated with the anchor cell. The one or more instructions may cause the network node to transmit the update associated with the OD-SIB in accordance with the indication.

In some aspects, an apparatus for wireless communication includes means for receiving, from an anchor cell on a first carrier frequency, an indication of an update associated with an OD-SIB for a non-anchor cell on a second carrier frequency, wherein the non-anchor cell is associated with the anchor cell. The apparatus may include means for obtaining the update associated with the OD-SIB in accordance with the indication.

In some aspects, an apparatus for wireless communication includes means for transmitting, via an anchor cell on a first carrier frequency, an indication of an update associated with an OD-SIB for a non-anchor cell on a second carrier frequency, wherein the non-anchor cell is associated with the anchor cell. The apparatus may include means for transmitting the update associated with the OD-SIB in accordance with the indication.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
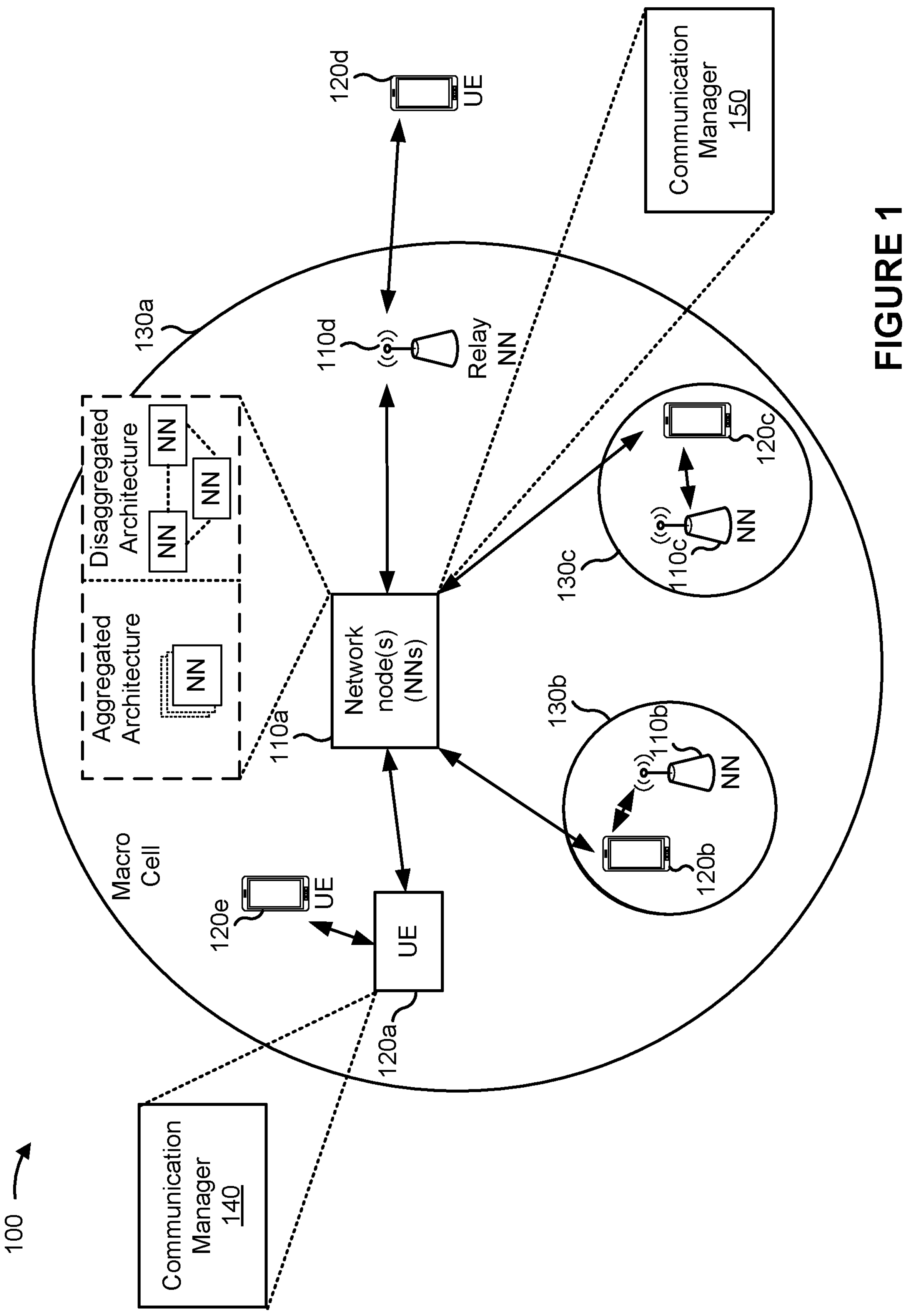
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A user equipment (UE) may operate in an idle or inactive mode in which a radio resource control (RRC) connection with a wireless network is inactive, suspended, or not established. The UE may select a suitable cell on which to register (referred to as "camping"). From the idle or inactive mode, the UE may enter a connected mode and may connect to the cell on which the UE is registered. When registered or camped on a cell, the UE can receive system information for the cell and can initiate an RRC connection establishment on the camped cell.

A cell may broadcast system information that includes information relating to accessing the cell or operating in a coverage area of the cell. One form of system information is a system information block (SIB) 1 (SIB1). A SIB1 may also be referred to as remaining minimum system information (where the minimum system information includes the SIB1 and a master information block (MIB) that indicates a resource for SIB1) carries cell access related information, such as information regarding availability of other SIBs, RRC information that is common to all UEs, and cell barring information (among other potential contents). A UE may not camp on a given cell unless the UE has received minimum system information for the given cell. A remainder of SIBs of a cell, other than SIB1 and the MIB, may be referred to as "other system information" (OSI).

In some examples, a network node (such as a gNB) may provide an anchor cell and one or more non-anchor cells. The anchor cell may provide coverage for both legacy UEs (that is, UEs that support communication only on the anchor cell) and UEs supporting the one or more non-anchor cells. An anchor cell may provide a synchronization signal block (SSB) and corresponding SIB1 (such as an always-on SSB and SIB1, in contrast to an on-demand SSB and SIB1), and an idle mode UE may camp on and monitor paging from the anchor cell.

In some aspects, the one or more non-anchor cells may support transmission of on-demand (OD) system information, such as an OD-SIB1. An OD-SIB1 may differ from a non-OD-SIB1, such as an always-on SIB1, in that the OD-SIB1 may be transmitted in response to a trigger such as an uplink wakeup signal or a condition being satisfied, whereas a non-OD-SIB1 may be transmitted periodically.

In some aspects, the one or more non-anchor cells may overlap the anchor cell, such that coverage areas of the one or more non-anchor cells are included in a coverage area of the anchor cell. This may be beneficial for various reasons. For example, a non-anchor cell that supports OD-SIB1 transmission may provide better service than an anchor cell for a connected-mode UE in some circumstances. As one example, depending on a UE's location, a non-anchor cell that supports OD-SIB1 transmission may provide better signal quality than an anchor cell (such as due to gain from beamforming or a smaller coverage area than the anchor cell). As another example, the non-anchor cell that supports OD-SIB1 transmission may provide a larger bandwidth than the anchor cell (for example, the OD-SIB1 cell may be a time division duplexing (TDD) cell with a 100 MHz bandwidth and the anchor cell may be a frequency division duplexing (FDD) cell with a 10 MHz bandwidth).

An anchor cell may provide a configuration for OD-SIB1 transmission for a non-anchor cell, associated with the anchor cell, that supports OD-SIB1 transmission. For example, the anchor cell may provide an uplink wakeup signal configuration to trigger OD-SIB1 transmission, and a physical downlink control channel (PDCCH) and/or physical downlink shared channel (PDSCH) configuration for transmission of the OD-SIB1 transmission. In some examples, an anchor cell may provide the configuration for OD-SIB1 transmission via a SIB referred to herein as SIBx. An idle-mode or inactive-mode UE may receive the OD-SIB1 from a non-anchor cell prior to being triggered to connect to the non-anchor cell, or when triggered to establish an RRC connection, such as for a mobile-originated or mobile-terminated call.

A cell can notify a UE of an update to one or more SIBs transmitted by the cell. For example, a cell may indicate a system information (SI) update in an upcoming SI modification period via a paging downlink control information (DCI). A UE in an RRC idle or inactive mode may monitor paging in each paging cycle. A UE in an RRC connected state may monitor paging DCI in at least one paging occasion within the SI modification period. When an SI modification is indicated in paging DCI, the UE may update (for example, receive) SI in the next SI modification period. For example, the UE may read SIB1 and may determine which SI is updated by checking a value tag (such as a parameter valueTag) in scheduling information (such as a field SI-SchedulingInfo) of the SIB1. If the value tag is unchanged from the value for an SI block stored by the UE, then the UE can skip updating the corresponding SI block, and if the value tag is modified, the UE may read the corresponding SI.

While the above mechanisms are suitable for a cell to indicate its own SI updates, SIB1 updates for a non-anchor cell that supports OD-SIB1 transmission may present challenges. For example, a UE camping on an anchor cell may not receive paging DCI from the non-anchor cell, meaning that indication via the non-anchor cell of an updated OD-SIB1 may not be supported. Furthermore, in some examples, a configuration for OD-SIB1 transmission (as provided via SIBx) may be updated, whereas in other examples, the content of OD-SIB1 may be updated, thereby adding complexity for indication of OD-SIB1 updates. Without mechanisms for indicating an updated configuration for OD-SIB1 transmission or an updated OD-SIB1, operation of non-anchor cells may be impeded and updates of SI may be delayed.

Various aspects relate generally to indication of an update relating to OD system information, such as OD-SIB1. Some aspects more specifically relate to indication on an anchor cell of an update to a non-anchor cell's OD-SIB or configuration relating to OD-SIB1. In some aspects, a UE may receive, from an anchor cell on a first carrier frequency, an indication of an update associated with an OD-SIB for a non-anchor cell on a second carrier frequency. The UE may obtain the update in accordance with the indication. For example, the update may be for a configuration for OD-SIB1, or may be for content of SIB1.

In some aspects, the indication may be provided on a paging occasion associated with UEs that support the OD-SIB. Additionally, or alternatively, the indication may be provided via paging DCI, such as in an OD system information modification bit for a non-anchor cell, or via a system information modification bit of a short message of the paging DCI.

Some aspects described herein provide updating associated with an OD-SIB, such as OD-SIB1, in association with mobility of the UE. For example, the UE may obtain an update associated with an OD-SIB in association with moving from coverage of one non-anchor cell to another non-anchor cell. As another example, the UE may obtain the update in association with moving from coverage of one anchor cell to another anchor cell or from coverage of one anchor cell group to another anchor cell group.

Particular aspects of the subject matter described in this disclosure can be implemented to realize one or more of the following potential advantages. In some examples, by providing the indication on the anchor cell of the update to the non-anchor cell's OD-SIB or configuration relating to OD-SIB1, the described techniques can be used to update OD-SIB1 on a cell on which the UE is not camped, thereby enabling updating of OD-SIB1 on a cell from which the UE does not monitor a physical downlink control channel, which enables operation of non-anchor cells and efficient updating of OD-SIB1. By providing the indication on a paging occasion associated with UEs that support the OD-SIB, compatibility with UEs that do not support the OD-SIB is improved. By providing the indication via an OD system information modification bit for a non-anchor cell, compatibility with UEs that do not support the OD-SIB is improved. By providing the indication via a system information modification bit of a short message, overhead is reduced.

By obtaining an update associated with an OD-SIB (such as OD-SIB1) in association with moving from coverage of one non-anchor cell to another non-anchor cell, efficiency of updating the OD-SIB is improved. As another example, the UE may obtain the update in association with moving from coverage of one anchor cell to another anchor cell or from coverage of one anchor cell group to another anchor cell group, so that overhead associated with updating the OD-SIB is reduced.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

A network node 110 may support system information (SI) modification. For example, a network node 110 may transmit paging DCI to indicate an SI update in an upcoming SI modification period. A UE 120 in an RRC idle or inactive state may monitor paging in every paging cycle. A UE 120 in an RRC connected state may monitor paging DCI in at least one paging occasion within an SI modification period. When SI modification is indicated in a paging DCI, the UE 120 may update SI in a next (in time) SI modification period after an SI modification period in which the paging DCI was received. The UE 120 may read SIB1 and may determine which SI is updated by checking a value tag (such as a parameter valueTag in SI-SchedulingInfo). If the value tag is unchanged from the value for a stored version of an SIB, the UE 120 can skip updating the SIB. If the value tag is modified, the UE 120 may read (that is, update) the corresponding SIB.

In some aspects, the UE 120 may include a communication manager 140. As described in more detail elsewhere herein, the communication manager 140 may receive, from an anchor cell on a first carrier frequency, an indication of an update associated with an OD-SIB for a non-anchor cell on a second carrier frequency, wherein the non-anchor cell is associated with the anchor cell; and obtain the update associated with the OD-SIB in accordance with the indication. Additionally, or alternatively, the communication manager 140 may perform one or more other operations described herein.

In some aspects, the network node 110 may include a communication manager 150. As described in more detail elsewhere herein, the communication manager 150 may transmit, via an anchor cell on a first carrier frequency, an indication of an update associated with an OD-SIB for a non-anchor cell on a second carrier frequency, wherein the non-anchor cell is associated with the anchor cell; and transmit the update associated with the OD-SIB in accordance with the indication. Additionally, or alternatively, the communication manager 150 may perform one or more other operations described herein.

Figure 2:
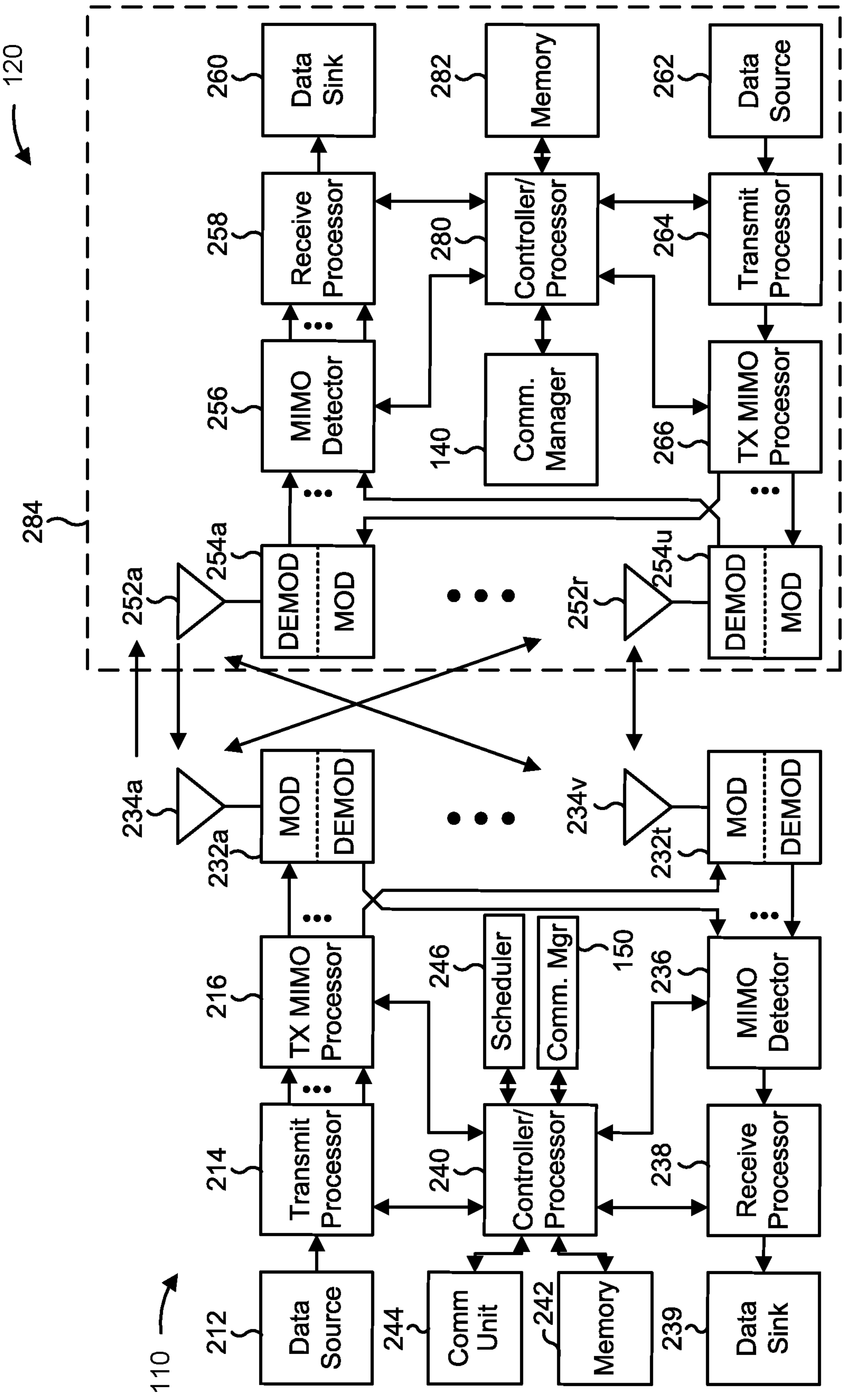
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
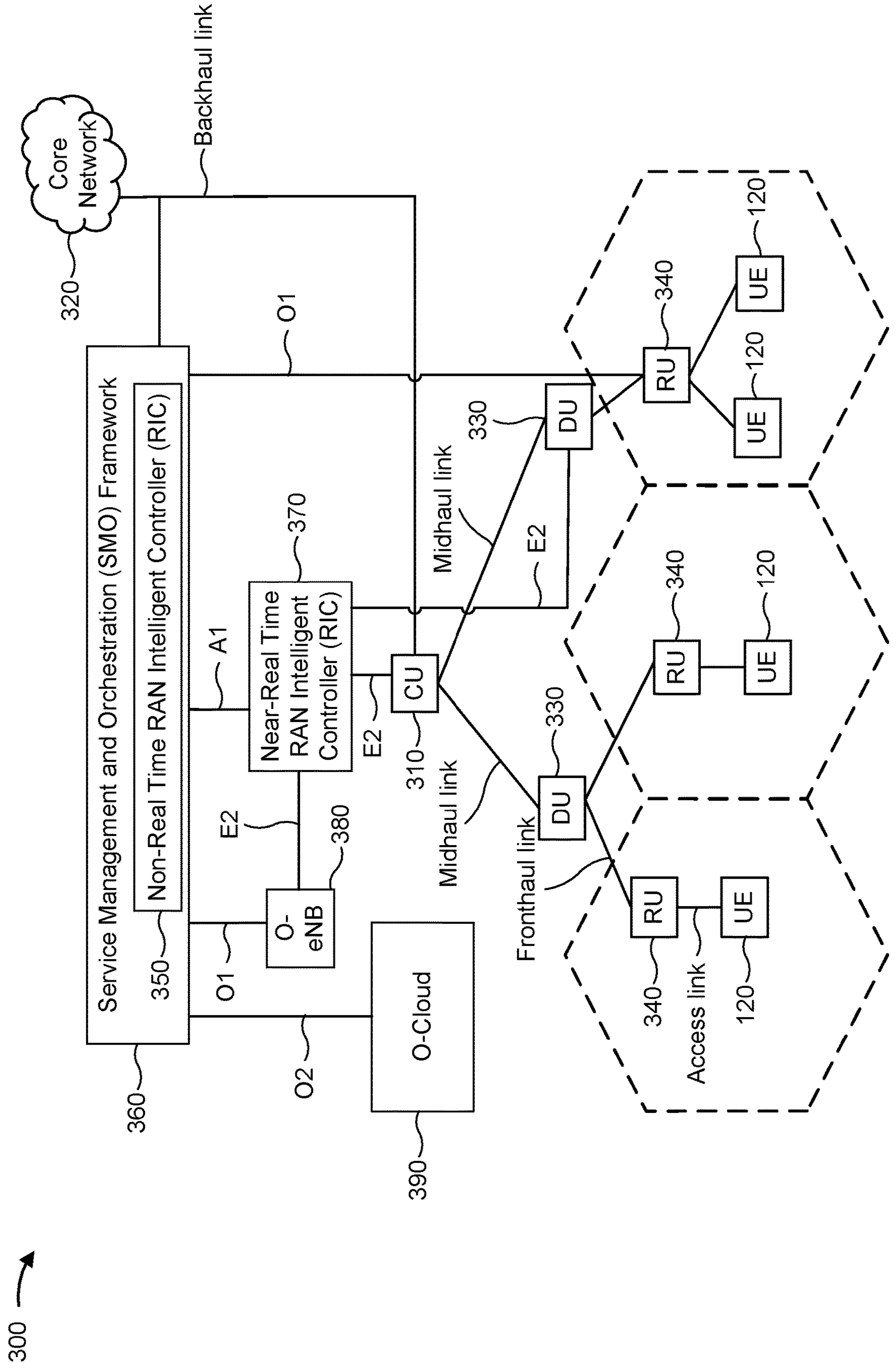
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with OD-SIB updating, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, or other processes as described herein. In some examples, executing instructions may include running the instructions, converting the instructions, compiling the instructions, and/or interpreting the instructions, among other examples.

In some aspects, the UE 120 includes means for receiving, from an anchor cell on a first carrier frequency, an indication of an update associated with an OD-SIB for a non-anchor cell on a second carrier frequency, wherein the non-anchor cell is associated with the anchor cell; and/or means for obtaining the update associated with the OD-SIB in accordance with the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, via an anchor cell on a first carrier frequency, an indication of an update associated with an OD-SIB for a non-anchor cell on a second carrier frequency, wherein the non-anchor cell is associated with the anchor cell; and/or means for transmitting the update associated with the OD-SIB in accordance with the indication. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
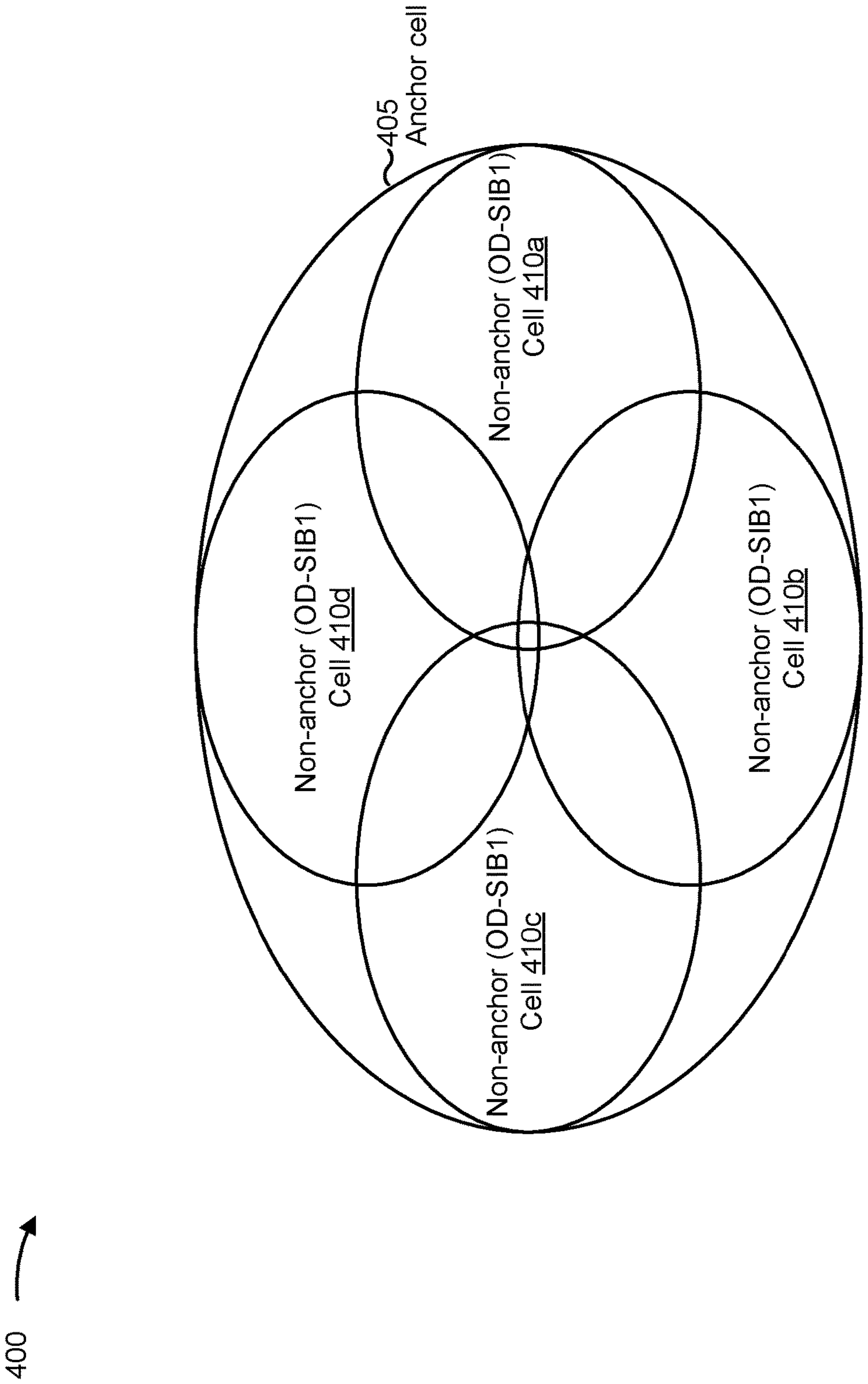
FIG. 4 is a diagram illustrating an example of an anchor cell and a plurality of non-anchor cells.

FIG. 4 is a diagram illustrating an example 400 of an anchor cell 405 and a plurality of non-anchor cells 410*a*, 410*b*, 410*c*, and 410*d*. "Non-anchor cell 410" can refer to one or more of the non-anchor cells 410*a*, 410*b*, 410*c*, and 410*d*. In some aspects, as shown, coverage areas of non-anchor cells 410 may be included in a coverage area of an anchor cell 405. In some other aspects, a coverage area of a non-anchor cell 410 may not be fully included in the coverage area of the anchor cell 405. A non-anchor cell 410 may be associated with an anchor cell 405 if a coverage area of the non-anchor cell 410 is included in a coverage area of the anchor cell 405. Additionally or alternatively, a non-anchor cell 410 may be associated with an anchor cell 405 if the anchor cell 405 manages the non-anchor cell 410 or handles communications associated with configuring or operating the non-anchor cell 410 (such as SIBx transmission, as described herein).

A UE 120 may register (for example, camp) on the anchor cell 405. For example, the UE 120 may monitor a paging physical downlink control channel (PDCCH) for paging DCI on the anchor cell 405. The anchor cell 405 may provide a common OD-SIB1 configuration for the non-anchor cells 410. For example, the anchor cell 405 may transmit a SIB, referred to herein as "SIBx," that indicates the common OD-SIB1 configuration. In some aspects, the anchor cell 405 may broadcast SIBx. Additionally, or alternatively, the anchor cell may transmit SIBx as an on-demand SIB such as in accordance with a request from a UE 120. Reference herein to "SIBx" should be understood to refer to a SIB that indicates a common OD-SIB1 configuration.

In some aspects, the common OD-SIB1 configuration may include a downlink configuration for PDCCH or physical downlink shared channel (PDSCH) transmission for SIB1 (such as OD-SIB1) delivery. Additionally or alternatively, the common OD-SIB1 configuration may include a synchronization signal block (SSB) transmission parameter for uplink wakeup signal (UL-WUS) transmission using a physical random access (PRACH) signal. Additionally or alternatively, the common OD-SIB1 configuration may include an uplink configuration for the UL-WUS transmission. Additionally or alternatively, the common OD-SIB1 configuration may include a physical uplink control channel (PUCCH) configuration, which may be used for hybrid automatic repeat request (HARQ) acknowledgment (ACK) transmission.

The anchor cell 405 may be on a first carrier frequency, which may be referred to as a first frequency layer. A non-anchor cell 410 may be on a second carrier frequency different than the first carrier frequency. In some aspects, different non-anchor cells 410 of an anchor cell 405 may be on different carrier frequencies. In some aspects, all non-anchor cells 410 of an anchor cell 405 may be on the same carrier frequency.

Figure 5:
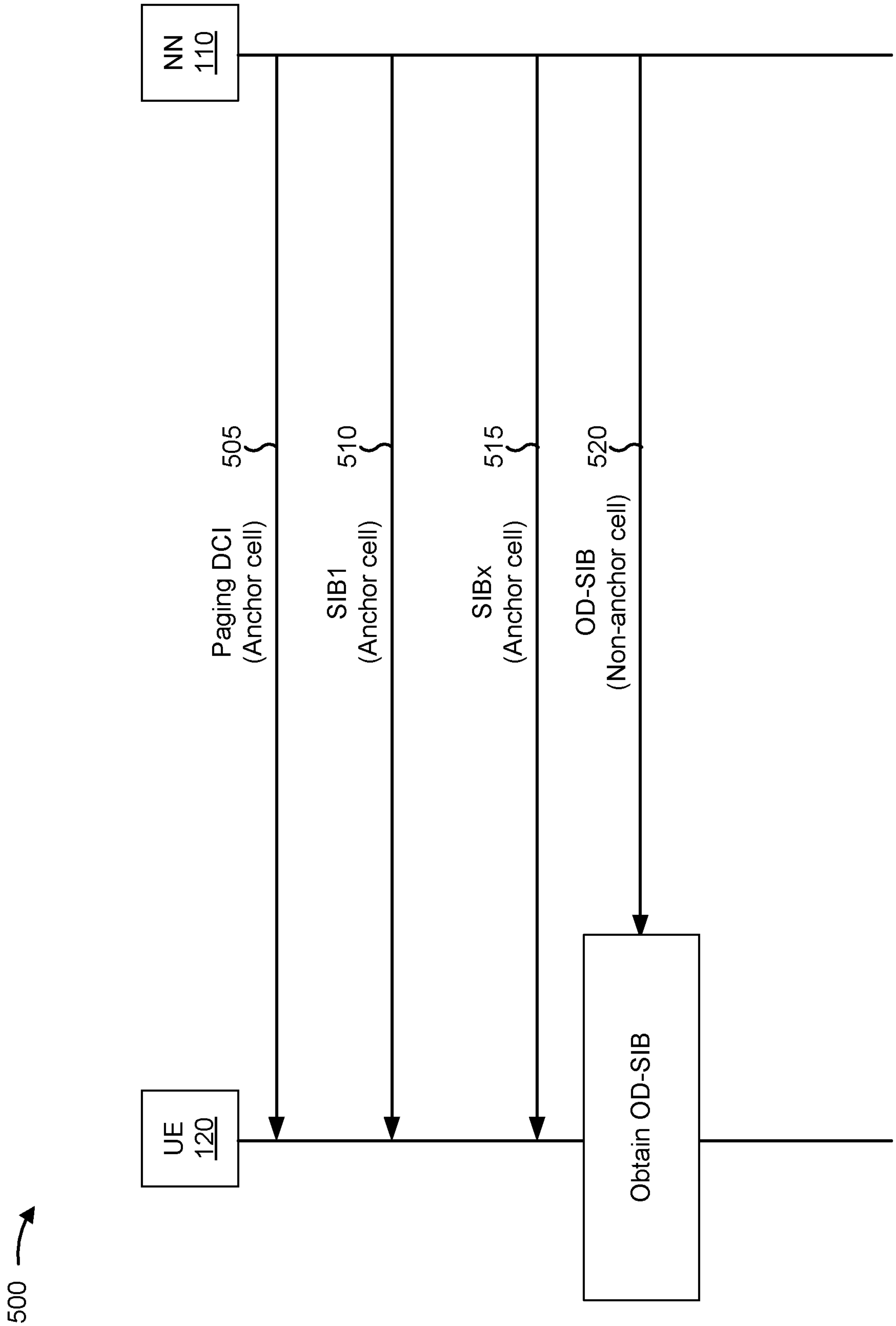
FIG. 5 is a diagram illustrating an example of signaling for updating an on-demand system information block (OD-SIB) or an OD-SIB cell configuration associated with an OD-SIB.

FIG. 5 is a diagram illustrating an example 500 of signaling for updating an OD-SIB 520 or an OD-SIB cell configuration associated with an OD-SIB. Example 500 includes a UE 120 and a network node 110. The network node 110 may implement an anchor cell 405 and one or more non-anchor cells 410 that are associated with the anchor cell 405. In example 500, communications between the UE 120 and the network node 110 may be via the anchor cell 405 unless noted otherwise. The UE 120 may be registered on the anchor cell 405, and may be in an RRC idle or inactive state.

As shown, the network node 110 may transmit, and the UE 120 may receive, paging DCI 505. In some aspects, the paging DCI 505 may indicate a modification to a SIB. For example, the paging DCI 505 may indicate a modification to SIBx, which is transmitted by the anchor cell 405 and may indicate an updated OD-SIB cell configuration. As another example, the paging DCI 505 may indicate a modification to an OD-SIB 520 such as OD-SIB1, which is transmitted by a non-anchor cell 410. Thus, the anchor cell 405 may notify the UE 120 of a modification of an OD-SIB1 for non-anchor cells 410 with overlapping coverage with the anchor cell 405, and the notification may be provided in paging DCI 505 from the anchor cell 405.

In some aspects, the paging DCI 505 may include an indication of an update associated with an OD-SIB 520, such as OD-SIB1 (that is, an OD-SIB that comprises cell access related information). For example, the update associated with the OD-SIB may include an update to OD-SIB1 as transmitted by the non-anchor cell 410 (that is, the paging DCI 505 may indicate the modification to OD-SIB1). As another example, the update associated with the OD-SIB may include an update to SIBx, such that an OD-SIB cell configuration of the non-anchor cell 410 is updated.

In some aspects, the indication of the update associated with the OD-SIB 520, included in the paging DCI 505, may comprise an SI modification bit (such as a SystemInfoModification bit) of a short message of the paging DCI 505. For example, the SI modification bit may indicate for the UE 120 to check a SIB1 510 for a value tag that indicates whether a SIB corresponding to the value tag (such as SIBx) has changed. As another example, the value tag may indicate whether the UE 120 is to receive (that is, read) SIBx from the anchor cell 405. By indicating that SIBx has changed or to receive SIBx, the anchor cell 405 may facilitate updating of an OD-SIB cell configuration (by providing an updated SIBx) or an OD-SIB (by providing a changed value tag in SIBx that indicates or is associated with the OD-SIB).

In some aspects, the indication of the update associated with the OD-SIB 520, included in the paging DCI 505, may comprise an OD SI modification bit for the non-anchor cell 410. For example, the OD SI modification bit may be separate from an SI modification bit associated with the anchor cell 405 (such as an SI modification bit of a short message of the paging DCI 505). In some aspects, the OD SI modification bit may occupy a reserved field in a short message separate from the SI modification bit. In some aspects, the OD SI modification bit may be compatible with UEs 120 that support OD-SIB1 transmission and/or access via non-anchor cells 410. Thus, legacy UEs camping on the anchor cell 405 may not be affected by OD-SIB1 updating using the OD SI modification bit. By providing the OD SI modification bit, the network node 110 can also indicate that the OD-SIB 520 is updated without the UE 120 reading SIB1 510 or SIBx 515, thereby reducing reception resource usage at the UE 120. In some examples, the network node 110 may provide the OD SI modification bit and an SI modification bit, such that the UE 120 receives SIB1 510 (which may include a value tag associated with SIBx 515) and accordingly receives SIBx 515. Thus, the network node 110 may provide an update to both SIBx 515 and OD-SIB 520.

In some aspects, different OD SI modification bits may be associated with different carrier frequencies (such as different non-anchor cells 410). For example, a first OD SI modification bit may be associated with a first carrier frequency (corresponding, for example, to a first non-anchor cell 410) and a second OD SI modification bit may be associated with a second carrier frequency (corresponding, for example, to a second non-anchor cell 410) which may be different than the first carrier frequency. In this example, the paging DCI 505 may include multiple OD SI modification bits, such as in a bitmap, and each OD SI modification bit may be associated with a different carrier frequency or frequency layer.

In some aspects, the network node 110 may transmit, and the UE 120 may receive, the paging DCI 505 on a paging occasion associated with UEs that support the OD-SIB 520, such as UEs that support OD-SIB1 or communication via non-anchor cells 410. For example, the network node 110 may transmit the paging DCI 505 only on paging occasions associated with UEs 120 supporting OD-SIB1 cell operation, thereby reducing unnecessary paging DCI transmission to legacy UEs (that is, UEs that do not support OD-SIB1 cell operation).

As shown, the network node 110 may transmit, and the UE 120 may receive, SIB1 510 from the anchor cell 405. In some aspects, the network node 110 may transmit, and the UE 120 may receive, the SIB1 510 in a next SI modification period after an SI modification period in which the paging DCI 505 is transmitted/received.

In some aspects, the SIB1 510 may include a value tag associated with SIBx 515. SIBx 515 may be a SIB, transmitted from the anchor cell 405, that carries an OD-SIB cell configuration associated with the OD-SIB 520. In some aspects, the value tag (such as "valueTag-SIBx") may be associated with SIBx 515. For example, the value tag may be specific to SIBx, or may indicate SIBx. Thus, the SIB1 510 may indicate that the UE 120 is to receive (that is, read) SIBx. In some aspects, the paging DCI 505 may include an SI modification bit (as opposed to an OD SI modification bit) and the SIB1 510 may include the value tag associated with SIBx 515, thereby enabling indication of modification of SIBx 515 without a separate OD SI modification bit. The SIBx 515 may then indicate no change associated with the OD-SIB 520, thereby enabling indication of modification of only SIBx 515. Alternatively, the SIBx 515 may indicate a change to OD-SIB 520 (such as via a value tag of the SIBx 515), enabling updating of OD-SIB 520 in accordance with indications transmitted via the anchor cell 405.

In some aspects, the SIB1 510 may include a value tag associated with the OD-SIB 520 of the non-anchor cell. In some aspects, the value tag (such as "valueTag-OD-SIB1") may be associated with SIB1 520. For example, the value tag may be specific to OD-SIB1, or may indicate OD-SIB1. Thus, the SIB1 510 may indicate that the UE 120 is to receive (that is, read) the OD-SIB1. In some aspects, the paging DCI 505 may include an SI modification bit (as opposed to an OD SI modification bit) and the SIB1 510 may include the value tag associated with OD-SIB 520, thereby enabling indication of modification of OD-SIB 520 without a separate OD SI modification bit.

As shown, in some aspects, the network node 110 may transmit (via the anchor cell 405), and the UE 120 may receive, a SIBx 515. The SIBx 515 may carry an OD-SIB cell configuration, as defined in connection with FIG. 4. In some aspects, a SIBx 515 may carry an update associated with the OD-SIB 520 for the non-anchor cell 410. For example, a SIBx 515 may carry an OD-SIB cell configuration, and the OD-SIB cell configuration may comprise the update.

In some aspects, SIBx 515 may indicate an update to the OD-SIB 520. For example, SIBx 515 may include a value tag that indicates that OD-SIB 520 is updated. In some aspects, different value tags may be associated with different carrier frequencies. For example, a first value tag may be associated with a first carrier frequency (corresponding, for example, to a first non-anchor cell 410) and a second value tag may be associated with a second carrier frequency (corresponding, for example, to a second non-anchor cell 410) which may be different than the first carrier frequency. In this example, SIBx 515 may carry multiple value tags, and each value tag of the multiple value tags may correspond to a different carrier frequency or frequency layer.

As shown, the network node 110 may transmit (via the non-anchor cell 410), and the UE 120 may receive, an OD-SIB 520 such as OD-SIB1. In some aspects, the OD-SIB 520 such as OD-SIB1 may comprise an update associated with the OD-SIB 520. For example, the OD-SIB 520 may be an updated OD-SIB1 (relative to a prior OD-SIB1 transmitted by the network node 110 and received by the UE 120). In some aspects, the network node 110 may transmit the OD-SIB 520 in a next OD-SIB modification period after an OD-SIB modification period in which the indication of the update associated with the OD-SIB 520 is received (such as in a next OD-SIB modification period after the indication is received in an OD SI modification bit of paging DCI 505 or a value tag of SIBx 515). For example, the next OD-SIB modification period may be an OD-SIB1 modification period, and may be configured in SIBx 515 as part of an OD-SIB cell configuration. In this example, the network node 110 may transmit OD-SIB 520 without an explicit request via a UL-WUS.

In some aspects, the UE 120 may request an OD-SIB transmission to update the OD-SIB 520. For example, the UE 120 may transmit a request to the non-anchor cell 410 (such as via a UL-WUS or other transmission) to update the OD-SIB 520. In some aspects, the UE 120 may transmit the request in accordance with an OD-SIB cell configuration, such as using a PRACH resource and/or a PUCCH configuration indicated by the OD-SIB cell configuration. In this example, the network node 110 may provide (such as in response to the request) a paging DCI 505 or SIBx 515 that includes an indication of an update associated with the OD-SIB 520.

Figure 6:
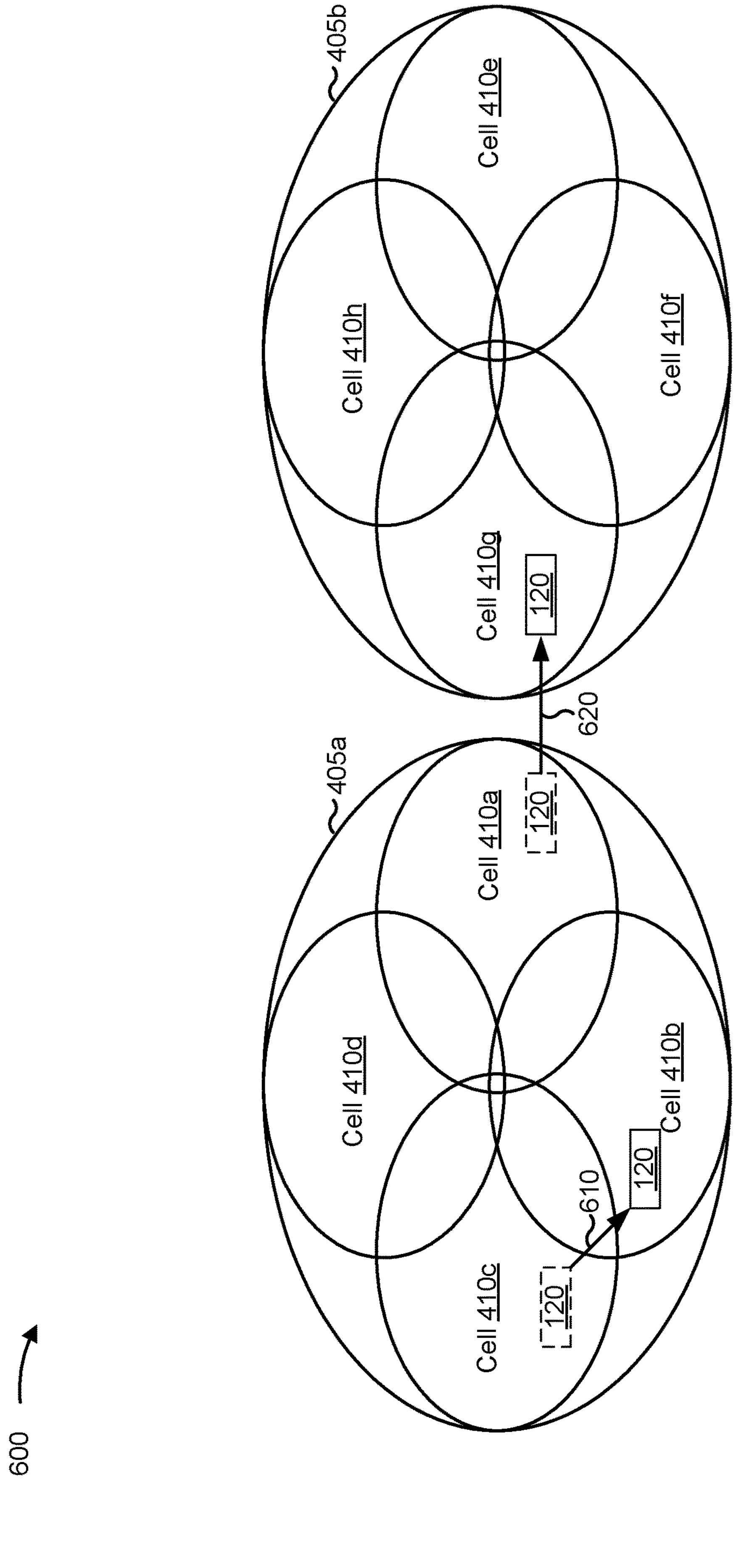
FIG. 6 is a diagram illustrating an example of updating an OD-SIB in association with mobility of a UE.

FIG. 6 is a diagram illustrating an example 600 of updating an OD-SIB such as OD-SIB1 in association with mobility of a UE 120. Example 600 includes a first anchor cell 405*a* and a second anchor cell 405*b*. The first anchor cell 405*a* is associated with a first set of non-anchor cells 410*a*-410*d*, and the second anchor cell 405*b* is associated with a second set of non-anchor cells 410*e*-410*h*. Example 600 provides examples of when a network node 110 and/or UE 120 may perform or trigger an update associated with an OD-SIB such as OD-SIB1 (such as OD-SIB 520), or an OD-SIB cell configuration (such as an OD-SIB cell configuration provided via SIBx 515) may be updated in connection with mobility. In the context of FIG. 6, "performing or triggering an update associated with an OD-SIB" may include any one or more of the operations described with regard to FIG. 5. In some aspects, the first anchor cell 405*a* may be provided by a first network node 110 and the second anchor cell 405*b* may be provided by a second network node 110 different than the first network node 110. In some aspects, the first anchor cell 405*a* and the second anchor cell 405*b* may be provided by the same network node 110.

In some aspects, a network node 110 (such as a network node 110 that provides the first anchor cell 405*a* or the second anchor cell 405*b*) may transmit, and the UE 120 may receive, a configuration. The configuration may indicate a condition for performing or triggering an update associated with the OD-SIB (such as OD-SIB 520) in association with mobility of the UE 120.

For example, the configuration may indicate to perform or trigger an update associated with the OD-SIB upon mobility from coverage of a first non-anchor cell 410 to coverage of a second non-anchor cell 410. This is illustrated by reference number 610.

As another example, the configuration may indicate to perform or trigger an update associated with the OD-SIB upon mobility from coverage of a first anchor cell 405 to coverage of a second anchor cell 405. This is illustrated by reference number 620. In this example, the UE 120 may not perform or trigger an update associated with the OD-SIB when moving within the coverage of the same anchor cell 405, which is illustrated by reference number 610.

As another example, the configuration may indicate to perform or trigger an update associated with the OD-SIB upon mobility from coverage of a first anchor cell 405 associated with a first cell group identifier (such as a first OD-SIB1-Anchor-Cell-group-ID) to coverage of a second anchor cell 405 associated with a second cell group identifier (such as a second OD-SIB1-Anchor-Cell-group-ID). In this example, the UE 120 may not perform or trigger an update associated with the OD-SIB when moving from coverage of an anchor cell 405*a* to an anchor cell 405*b* if the anchor cell 405*a* and the anchor cell 405*b* are associated with the same cell group identifier. The UE 120 may perform or trigger an update associated with the OD-SIB when moving from coverage of an anchor cell 405*a* to an anchor cell 405*b* if the anchor cell 405*a* is associated with a first cell group identifier and the anchor cell 405*b* is associated with a second cell group identifier different from the first cell group identifier. Thus, within the coverage of a same anchor cell group, the UE 120 may not perform or trigger an update of OD-SIB1.

Figure 7:
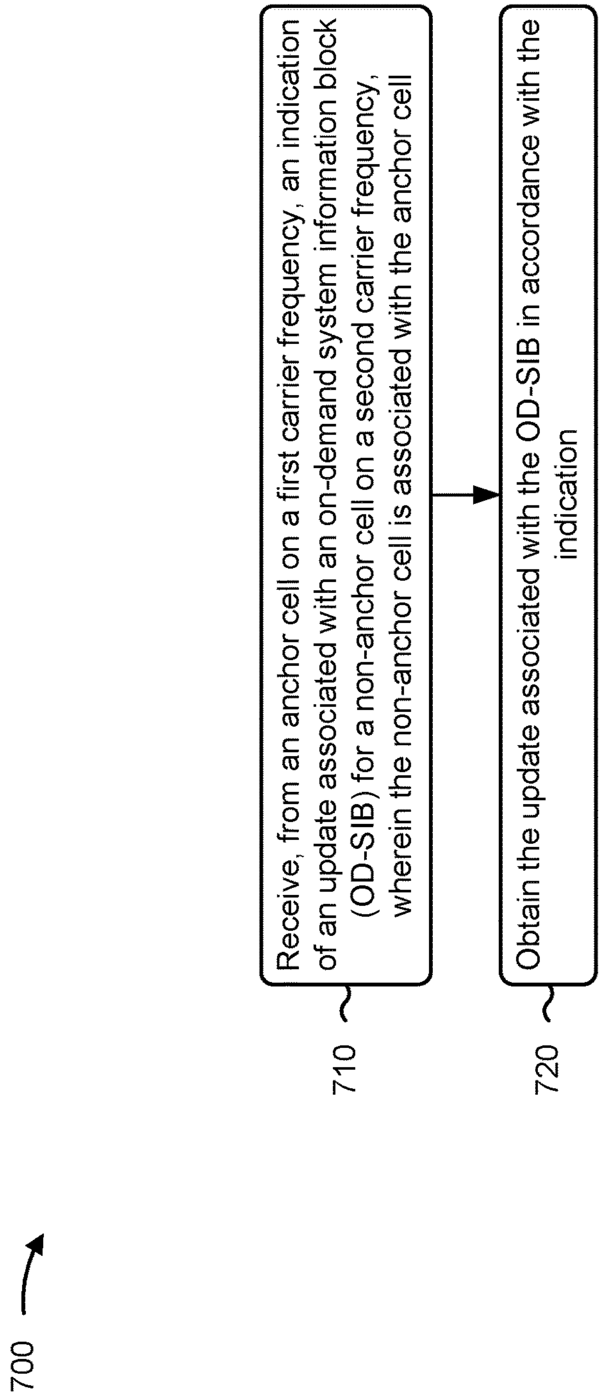
FIG. 7 is a flowchart illustrating an example process performed, for example, at a UE or an apparatus of a UE that supports OD-SIB updating in accordance with the present disclosure.

FIG. 7 is a flowchart illustrating an example process 700 performed, for example, at a UE or an apparatus of a UE that supports OD-SIB updating in accordance with the present disclosure. Example process 700 is an example where the apparatus or the UE (for example, UE 120) performs operations associated with OD-SIB updating.

As shown in FIG. 7, in some aspects, process 700 may include receiving, from an anchor cell on a first carrier frequency, an indication of an update associated with an OD-SIB for a non-anchor cell on a second carrier frequency, wherein the non-anchor cell is associated with the anchor cell (block 710). For example, the UE (such as by using communication manager 140 or reception component 902, depicted in FIG. 9) may receive, from an anchor cell on a first carrier frequency, an indication of an update associated with an OD-SIB for a non-anchor cell on a second carrier frequency, wherein the non-anchor cell is associated with the anchor cell, as described above.

As further shown in FIG. 7, in some aspects, process 700 may include obtaining the update associated with the OD-SIB in accordance with the indication (block 720). For example, the UE (such as by using communication manager 140 or reception component 902, depicted in FIG. 9) may obtain the update associated with the OD-SIB in accordance with the indication, as described above.

Process 700 may include additional aspects, such as any single aspect or any combination of aspects described below or in connection with one or more other processes described elsewhere herein.

In a first additional aspect, the OD-SIB comprises cell access related information.

In a second additional aspect, alone or in combination with the first aspect, the UE is camped on the anchor cell in an idle or inactive state.

In a third additional aspect, alone or in combination with one or more of the first and second aspects, a coverage area of the non-anchor cell is included in a coverage area of the anchor cell.

In a fourth additional aspect, alone or in combination with one or more of the first through third aspects, receiving the indication comprises receiving paging DCI that comprises the indication.

In a fifth additional aspect, alone or in combination with one or more of the first through fourth aspects, the indication comprises a system information modification bit of a short message of the paging DCI.

In a sixth additional aspect, alone or in combination with one or more of the first through fifth aspects, the paging DCI comprises an on-demand system information modification bit for the non-anchor cell, and the indication is separate from a system information modification bit for the anchor cell.

In a seventh additional aspect, alone or in combination with one or more of the first through sixth aspects, receiving the indication comprises receiving the indication on a paging occasion associated with UEs that support the OD-SIB.

In an eighth additional aspect, alone or in combination with one or more of the first through seventh aspects, receiving the indication comprises receiving a value tag associated with a SIB, transmitted from the anchor cell, that carries an OD-SIB cell configuration associated with the OD-SIB.

In a ninth additional aspect, alone or in combination with one or more of the first through eighth aspects, receiving the indication comprises receiving a value tag associated with the OD-SIB of the non-anchor cell.

In a tenth additional aspect, alone or in combination with one or more of the first through ninth aspects, the update associated with the OD-SIB comprises an update of an OD-SIB cell configuration associated with the OD-SIB.

In an eleventh additional aspect, alone or in combination with one or more of the first through tenth aspects, obtaining the update comprises obtaining the update via a SIB for OD-SIB cell configuration transmitted from the anchor cell.

In a twelfth additional aspect, alone or in combination with one or more of the first through eleventh aspects, the update associated with the OD-SIB comprises an update of the OD-SIB transmitted from the non-anchor cell.

In a thirteenth additional aspect, alone or in combination with one or more of the first through twelfth aspects, process 700 includes receiving a second indication of an update associated with a second OD-SIB of a second non-anchor cell on a third carrier frequency.

In a fourteenth additional aspect, alone or in combination with one or more of the first through thirteenth aspects, the indication comprises a separate on-demand system information modification bit of a paging downlink control information.

In a fifteenth additional aspect, alone or in combination with one or more of the first through fourteenth aspects, the indication comprises a separate value tag of a SIB associated with the second OD-SIB of the second non-anchor cell.

In a sixteenth additional aspect, alone or in combination with one or more of the first through fifteenth aspects, process 700 includes requesting, from the non-anchor cell, an OD-SIB transmission to update the OD-SIB.

In a seventeenth additional aspect, alone or in combination with one or more of the first through sixteenth aspects, obtaining the update comprises obtaining the update in a next OD-SIB modification period after receiving the indication.

In an eighteenth additional aspect, alone or in combination with one or more of the first through seventeenth aspects, process 700 includes receiving a configuration that indicates a condition for updating the OD-SIB in association with mobility of the UE.

In a nineteenth additional aspect, alone or in combination with one or more of the first through eighteenth aspects, obtaining the update comprises obtaining the update in association with moving from coverage of a first non-anchor cell to coverage of a second non-anchor cell, wherein the second non-anchor cell is the non-anchor cell.

In a twentieth additional aspect, alone or in combination with one or more of the first through nineteenth aspects, obtaining the update comprises obtaining the update in association with moving from coverage of a first anchor cell to coverage of a second anchor cell, wherein the second anchor cell is the anchor cell.

In a twenty-first additional aspect, alone or in combination with one or more of the first through twentieth aspects, obtaining the update comprises obtaining the update in association with moving from coverage of a first anchor cell associated with a first cell group identifier to coverage of a second anchor cell associated with a second cell group identifier, wherein the second anchor cell is the anchor cell.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
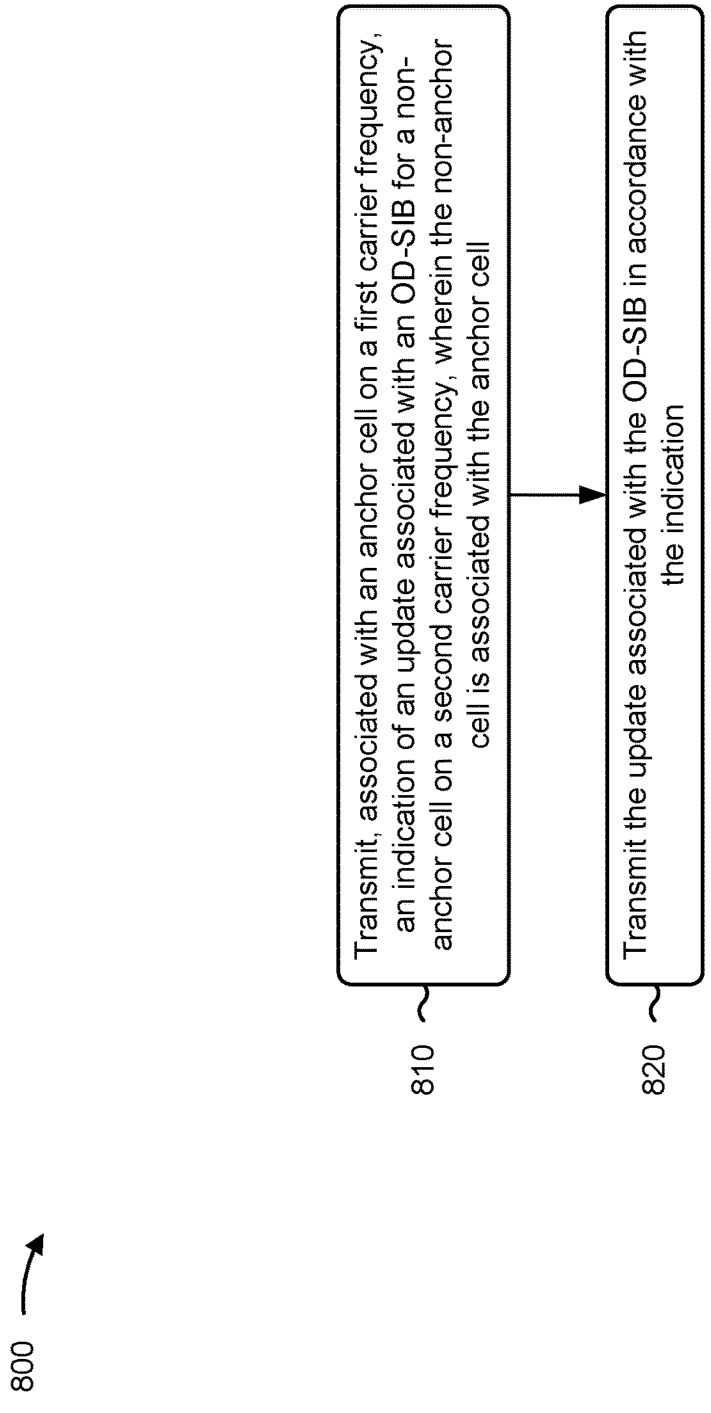
FIG. 8 is a flowchart illustrating an example process performed, for example, at a network node or an apparatus of a network node that supports OD-SIB updating in accordance with the present disclosure.

FIG. 8 is a flowchart illustrating an example process 800 performed, for example, at a network node or an apparatus of a network node that supports OD-SIB updating in accordance with the present disclosure. Example process 800 is an example where the apparatus or the network node (for example, network node 110) performs operations associated with OD-SIB updating.

As shown in FIG. 8, in some aspects, process 800 may include transmitting, via an anchor cell on a first carrier frequency, an indication of an update associated with an OD-SIB for a non-anchor cell on a second carrier frequency, wherein the non-anchor cell is associated with the anchor cell (block 810). For example, the network node (such as by using communication manager 150 or transmission component 1004, depicted in FIG. 10) may transmit, via an anchor cell on a first carrier frequency, an indication of an update associated with an OD-SIB for a non-anchor cell on a second carrier frequency, wherein the non-anchor cell is associated with the anchor cell, as described above.

As further shown in FIG. 8, in some aspects, process 800 may include transmitting the update associated with the OD-SIB in accordance with the indication (block 820). For example, the network node (such as by using communication manager 150 or transmission component 1004, depicted in FIG. 10) may transmit the update associated with the OD-SIB in accordance with the indication, as described above.

Process 800 may include additional aspects, such as any single aspect or any combination of aspects described below or in connection with one or more other processes described elsewhere herein.

In a first additional aspect, the OD-SIB comprises cell access related information.

In a second additional aspect, alone or in combination with the first aspect, a coverage area of the non-anchor cell is included in a coverage area of the anchor cell.

In a third additional aspect, alone or in combination with one or more of the first and second aspects, transmitting the indication comprises transmitting paging DCI that comprises the indication.

In a fourth additional aspect, alone or in combination with one or more of the first through third aspects, the indication comprises a system information modification bit of a short message of the paging DCI.

In a fifth additional aspect, alone or in combination with one or more of the first through fourth aspects, the paging DCI comprises an on-demand system information modification bit for the non-anchor cell, and the indication is separate from a system information modification bit for the anchor cell.

In a sixth additional aspect, alone or in combination with one or more of the first through fifth aspects, transmitting the indication comprises transmitting the indication on a paging occasion associated with UEs that support for the OD-SIB.

In a seventh additional aspect, alone or in combination with one or more of the first through sixth aspects, transmitting the indication comprises transmitting a value tag associated with a SIB, transmitted from the anchor cell, that carries an OD-SIB cell configuration associated with the OD-SIB.

In an eighth additional aspect, alone or in combination with one or more of the first through seventh aspects, transmitting the indication comprises transmitting a value tag associated with the OD-SIB of the non-anchor cell.

In a ninth additional aspect, alone or in combination with one or more of the first through eighth aspects, the update associated with the OD-SIB comprises an update of an OD-SIB cell configuration associated with the OD-SIB.

In a tenth additional aspect, alone or in combination with one or more of the first through ninth aspects, transmitting the update comprises transmitting the update via a SIB for OD-SIB cell configuration transmitted from the anchor cell.

In an eleventh additional aspect, alone or in combination with one or more of the first through tenth aspects, the update associated with the OD-SIB comprises an update of the OD-SIB transmitted from the non-anchor cell.

In a twelfth additional aspect, alone or in combination with one or more of the first through eleventh aspects, process 800 includes transmitting a second indication of an update associated with a second OD-SIB of a second non-anchor cell on a third carrier frequency.

In a thirteenth additional aspect, alone or in combination with one or more of the first through twelfth aspects, the indication comprises a separate on-demand system information modification bit of a paging downlink control information.

In a fourteenth additional aspect, alone or in combination with one or more of the first through thirteenth aspects, the indication comprises a separate value tag of a SIB associated with the second OD-SIB of the second non-anchor cell.

In a fifteenth additional aspect, alone or in combination with one or more of the first through fourteenth aspects, process 800 includes receiving a request for the OD-SIB via the non-anchor cell prior to transmitting the OD-SIB.

In a sixteenth additional aspect, alone or in combination with one or more of the first through fifteenth aspects, transmitting the update comprises transmitting the update via the non-anchor cell in a next OD-SIB modification period after the indication.

In a seventeenth additional aspect, alone or in combination with one or more of the first through sixteenth aspects, process 800 includes transmitting a configuration that indicates a condition for updating the OD-SIB in association with mobility.

In an eighteenth additional aspect, alone or in combination with one or more of the first through seventeenth aspects, transmitting the update comprises transmitting the update in association with a UE moving from coverage of a first non-anchor cell to coverage of a second non-anchor cell, wherein the second non-anchor cell is the non-anchor cell.

In a nineteenth additional aspect, alone or in combination with one or more of the first through eighteenth aspects, transmitting the update further comprises transmitting the update in association with a UE moving from coverage of a first anchor cell to coverage of a second anchor cell, wherein the second anchor cell is the anchor cell.

In a twentieth additional aspect, alone or in combination with one or more of the first through nineteenth aspects, transmitting the update further comprises transmitting the update in association with a UE moving from coverage of a first anchor cell associated with a first cell group identifier to coverage of a second anchor cell associated with a second cell group identifier, wherein the second anchor cell is the anchor cell.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
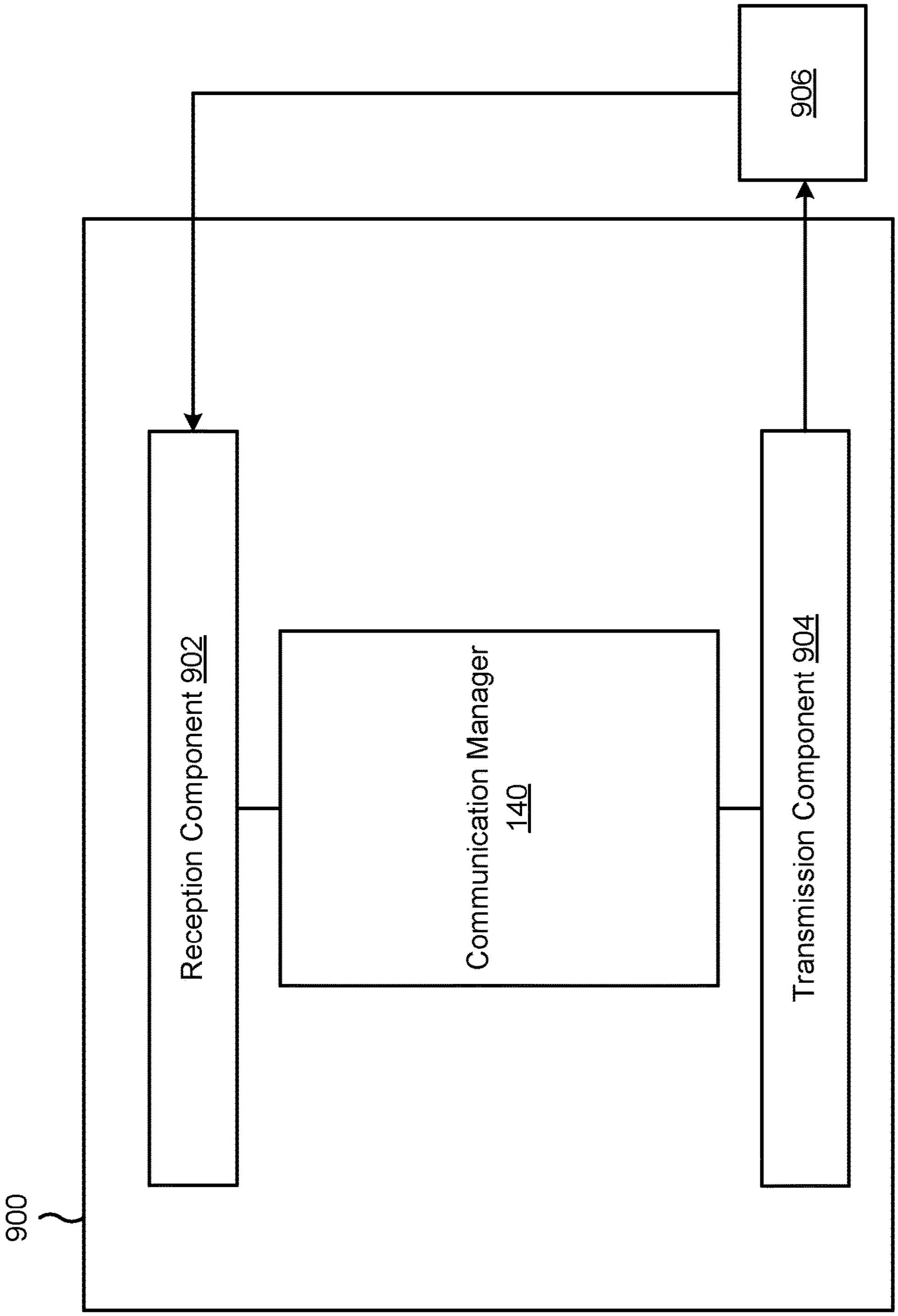
FIG. 9 is a diagram of an example apparatus for wireless communication that supports OD-SIB updating in accordance with the present disclosure.

FIG. 9 is a diagram of an example apparatus 900 for wireless communication that supports OD-SIB updating in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 4-6. Additionally or alternatively, the apparatus 900 may be configured to and/or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, one or more modems, one or more demodulators, one or more MIMO detectors, one or more receive processors, one or more controllers/processors, and/or one or more memories of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 904 may be co-located with the reception component 902 in one or more transceivers.

The communication manager 140 may receive or may cause the reception component 902 to receive, from an anchor cell on a first carrier frequency, an indication of an update associated with an OD-SIB for a non-anchor cell on a second carrier frequency, wherein the non-anchor cell is associated with the anchor cell. The communication manager 140 may obtain the update associated with the OD-SIB in accordance with the indication. In some aspects, the communication manager 140 may perform one or more operations described elsewhere herein as being performed by one or more components of the communication manager 140.

The communication manager 140 may include one or more controllers/processors and/or one or more memories of the UE 120 described above in connection with FIG. 2. For example, the communication manager 140 (or a portion of the communication manager 140) may be implemented as instructions or code stored in a non-transitory computer-readable medium and executable by one or more controllers or one or more processors to perform the functions or operations of the communication manager 140.

The reception component 902 may receive, from an anchor cell on a first carrier frequency, an indication of an update associated with an OD-SIB for a non-anchor cell on a second carrier frequency, wherein the non-anchor cell is associated with the anchor cell. The reception component 902 may obtain the update associated with the OD-SIB in accordance with the indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
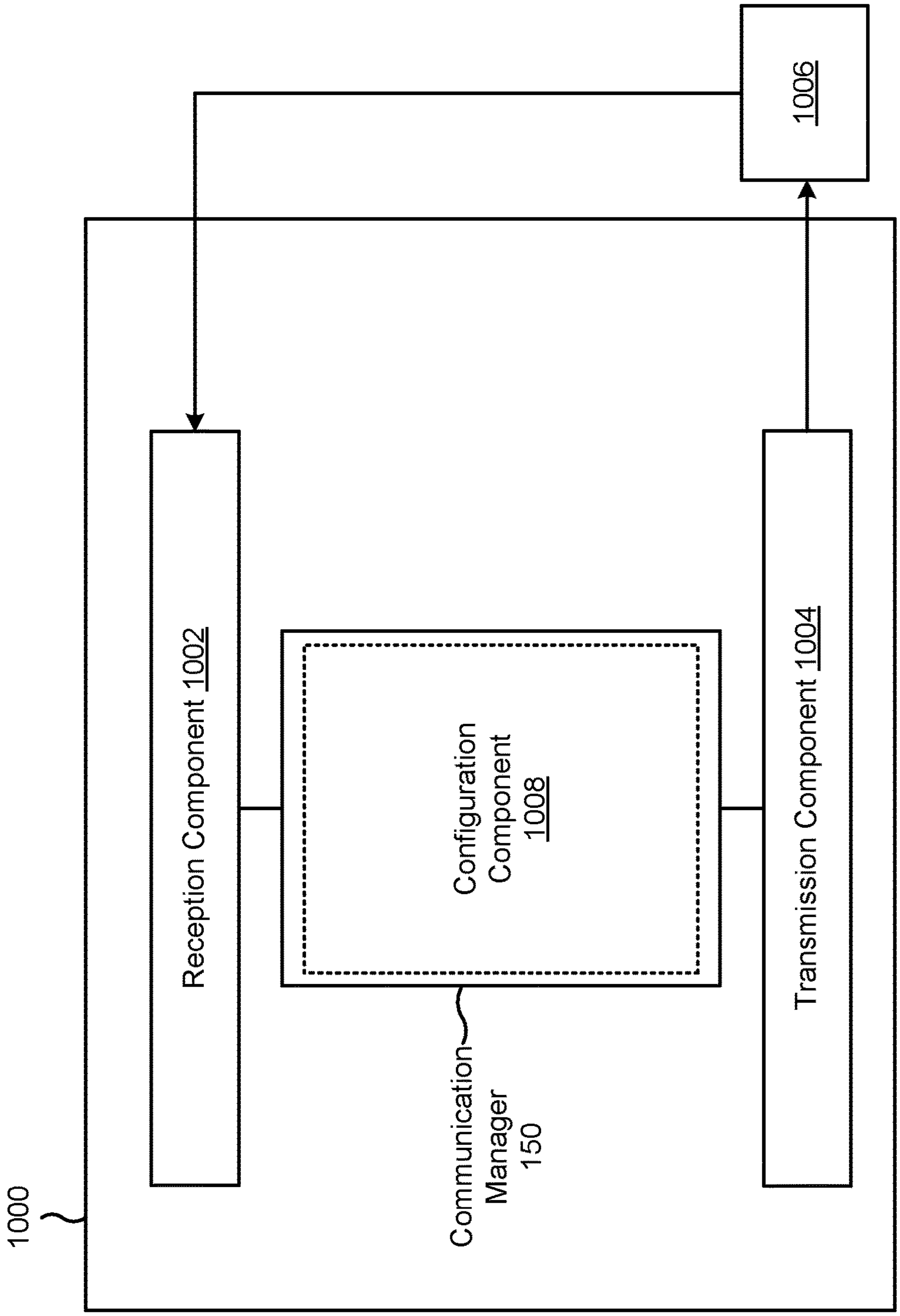
FIG. 10 is a diagram of an example apparatus for wireless communication that supports OD-SIB updating in accordance with the present disclosure.

FIG. 10 is a diagram of an example apparatus 1000 for wireless communication that supports OD-SIB updating in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIGS. 4-6. Additionally or alternatively, the apparatus 1000 may be configured to and/or operable to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, one or more modems, one or more demodulators, one or more MIMO detectors, one or more receive processors, one or more controllers/processors, and/or one or more memories of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1004 may be co-located with the reception component 1002 in one or more transceivers.

The communication manager 150 may transmit or may cause the transmission component 1004 to transmit, via an anchor cell on a first carrier frequency, an indication of an update associated with an OD-SIB for a non-anchor cell on a second carrier frequency, wherein the non-anchor cell is associated with the anchor cell. The communication manager 150 may transmit or may cause the transmission component 1004 to transmit the update associated with the OD-SIB in accordance with the indication. In some aspects, the communication manager 150 may perform one or more operations described elsewhere herein as being performed by one or more components of the communication manager 150.

The communication manager 150 may include one or more controllers/processors, one or more memories, one or more schedulers, and/or one or more communication units of the network node described above in connection with FIG. 2. In some aspects, the communication manager 150 includes a set of components, such as a configuration component 1008. Alternatively, the set of components may be separate and distinct from the communication manager 150. In some aspects, one or more components of the set of components may include or may be implemented within one or more controllers/processors, one or more memories, one or more schedulers, and/or one or more communication units of the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 1004 may transmit, via an anchor cell on a first carrier frequency, an indication of an update associated with an OD-SIB for a non-anchor cell on a second carrier frequency, wherein the non-anchor cell is associated with the anchor cell. The transmission component 1004 may transmit the update associated with the OD-SIB in accordance with the indication.

The configuration component 1008 may transmit a configuration that indicates a condition for updating the OD-SIB in association with mobility.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from an anchor cell on a first carrier frequency, an indication of an update associated with an on-demand system information block (OD-SIB) for a non-anchor cell on a second carrier frequency, wherein the non-anchor cell is associated with the anchor cell; and obtaining the update associated with the OD-SIB in accordance with the indication.

Aspect 2: The method of Aspect 1, wherein the OD-SIB comprises cell access related information.

Aspect 3: The method of any of Aspects 1-2, wherein the UE is camped on the anchor cell in an idle or inactive state.

Aspect 4: The method of any of Aspects 1-3, wherein a coverage area of the non-anchor cell is included in a coverage area of the anchor cell.

Aspect 5: The method of any of Aspects 1-4, wherein receiving the indication comprises receiving paging downlink control information (DCI) that comprises the indication.

Aspect 6: The method of Aspect 5, wherein the indication comprises a system information modification bit of a short message of the paging DCI.

Aspect 7: The method of Aspect 5, wherein the paging DCI comprises an on-demand system information modification bit for the non-anchor cell, and wherein the indication is separate from a system information modification bit for the anchor cell.

Aspect 8: The method of any of Aspects 1-7, wherein receiving the indication comprises receiving the indication on a paging occasion associated with UEs that support the OD-SIB.

Aspect 9: The method of any of Aspects 1-8, wherein receiving the indication comprises receiving a value tag associated with a SIB, transmitted from the anchor cell, that carries an OD-SIB cell configuration associated with the OD-SIB.

Aspect 10: The method of any of Aspects 1-9, wherein receiving the indication comprises receiving a value tag associated with the OD-SIB of the non-anchor cell.

Aspect 11: The method of any of Aspects 1-10, wherein the update associated with the OD-SIB comprises an update of an OD-SIB cell configuration associated with the OD-SIB.

Aspect 12: The method of Aspect 11, wherein obtaining the update comprises obtaining the update via a SIB for OD-SIB cell configuration transmitted from the anchor cell.

Aspect 13: The method of any of Aspects 1-12, wherein the update associated with the OD-SIB comprises an update of the OD-SIB transmitted from the non-anchor cell.

Aspect 14: The method of any of Aspects 1-13, further comprising receiving a second indication of an update associated with a second OD-SIB of a second non-anchor cell on a third carrier frequency.

Aspect 15: The method of Aspect 14, wherein the indication comprises a separate on-demand system information modification bit of a paging downlink control information.

Aspect 16: The method of Aspect 14, wherein the indication comprises a separate value tag of a SIB associated with the second OD-SIB of the second non-anchor cell.

Aspect 17: The method of any of Aspects 1-16, further comprising requesting, from the non-anchor cell, an OD-SIB transmission to update the OD-SIB.

Aspect 18: The method of any of Aspects 1-17, wherein obtaining the update comprises obtaining the update in a next OD-SIB modification period after receiving the indication.

Aspect 19: The method of any of Aspects 1-18, further comprising receiving a configuration that indicates a condition for updating the OD-SIB in association with mobility of the UE.

Aspect 20: The method of Aspect 19, wherein obtaining the update comprises obtaining the update in association with moving from coverage of a first non-anchor cell to coverage of a second non-anchor cell, wherein the second non-anchor cell is the non-anchor cell.

Aspect 21: The method of Aspect 19, wherein obtaining the update comprises obtaining the update in association with moving from coverage of a first anchor cell to coverage of a second anchor cell, wherein the second anchor cell is the anchor cell.

Aspect 22: The method of any of Aspects 1-21, wherein obtaining the update comprises obtaining the update in association with moving from coverage of a first anchor cell associated with a first cell group identifier to coverage of a second anchor cell associated with a second cell group identifier, wherein the second anchor cell is the anchor cell.

Aspect 23: A method of wireless communication performed by a network node, comprising: transmitting, via an anchor cell on a first carrier frequency, an indication of an update associated with an on-demand system information block (OD-SIB) for a non-anchor cell on a second carrier frequency, wherein the non-anchor cell is associated with the anchor cell; and transmitting the update associated with the OD-SIB in accordance with the indication.

Aspect 24: The method of Aspect 23, wherein the OD-SIB comprises cell access related information.

Aspect 25: The method of any of Aspects 23-24, wherein a coverage area of the non-anchor cell is included in a coverage area of the anchor cell.

Aspect 26: The method of any of Aspects 23-25, wherein transmitting the indication comprises transmitting paging downlink control information (DCI) that comprises the indication.

Aspect 27: The method of Aspect 26, wherein the indication comprises a system information modification bit of a short message of the paging DCI.

Aspect 28: The method of Aspect 26, wherein the paging DCI comprises an on-demand system information modification bit for the non-anchor cell, and wherein the indication is separate from a system information modification bit for the anchor cell.

Aspect 29: The method of any of Aspects 23-28, wherein transmitting the indication comprises transmitting the indication on a paging occasion associated with UEs that support for the OD-SIB.

Aspect 30: The method of any of Aspects 23-29, wherein transmitting the indication comprises transmitting a value tag associated with a SIB, transmitted from the anchor cell, that carries an OD-SIB cell configuration associated with the OD-SIB.

Aspect 31: The method of any of Aspects 23-30, wherein transmitting the indication comprises transmitting a value tag associated with the OD-SIB of the non-anchor cell.

Aspect 32: The method of any of Aspects 23-31, wherein the update associated with the OD-SIB comprises an update of an OD-SIB cell configuration associated with the OD-SIB.

Aspect 33: The method of Aspect 32, wherein transmitting the update comprises transmitting the update via a SIB for OD-SIB cell configuration transmitted from the anchor cell.

Aspect 34: The method of any of Aspects 23-33, wherein the update associated with the OD-SIB comprises an update of the OD-SIB transmitted from the non-anchor cell.

Aspect 35: The method of any of Aspects 23-34, further comprising transmitting a second indication of an update associated with a second OD-SIB of a second non-anchor cell on a third carrier frequency.

Aspect 36: The method of Aspect 35, wherein the indication comprises a separate on-demand system information modification bit of a paging downlink control information.

Aspect 37: The method of Aspect 35, wherein the indication comprises a separate value tag of a SIB associated with the second OD-SIB of the second non-anchor cell.

Aspect 38: The method of any of Aspects 23-37, further comprising receiving a request for the OD-SIB via the non-anchor cell prior to transmitting the OD-SIB.

Aspect 39: The method of any of Aspects 23-38, wherein transmitting the update comprises transmitting the update via the non-anchor cell in a next OD-SIB modification period after the indication.

Aspect 40: The method of any of Aspects 23-39, further comprising transmitting a configuration that indicates a condition for updating the OD-SIB in association with mobility.

Aspect 41: The method of any of Aspects 23-40, wherein transmitting the update comprises transmitting the update in association with a user equipment (UE) moving from coverage of a first non-anchor cell to coverage of a second non-anchor cell, wherein the second non-anchor cell is the non-anchor cell.

Aspect 42: The method of any of Aspects 23-41, wherein transmitting the update further comprises transmitting the update in association with a user equipment (UE) moving from coverage of a first anchor cell to coverage of a second anchor cell, wherein the second anchor cell is the anchor cell.

Aspect 43: The method of any of Aspects 23-42, wherein transmitting the update further comprises transmitting the update in association with a user equipment (UE) moving from coverage of a first anchor cell associated with a first cell group identifier to coverage of a second anchor cell associated with a second cell group identifier, wherein the second anchor cell is the anchor cell.

Aspect 44: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-43.

Aspect 45: An apparatus for wireless communication at a device, the apparatus comprising one or more memories and one or more processors coupled to the one or more memories, the one or more processors configured to cause the device to perform the method of one or more of Aspects 1-43.

Aspect 46: An apparatus for wireless communication, the apparatus comprising at least one means for performing the method of one or more of Aspects 1-43.

Aspect 47: A non-transitory computer-readable medium storing code for wireless communication, the code comprising instructions executable by one or more processors to perform the method of one or more of Aspects 1-43.

Aspect 48: A non-transitory computer-readable medium storing a set of instructions for wireless communication, the set of instructions comprising one or more instructions that, when executed by one or more processors of a device, cause the device to perform the method of one or more of Aspects 1-43.

Aspect 49: A device for wireless communication, the device comprising a processing system that includes one or more processors and one or more memories coupled with the one or more processors, the processing system configured to cause the device to perform the method of one or more of Aspects 1-43.

Aspect 50: An apparatus for wireless communication at a device, the apparatus comprising one or more memories and one or more processors coupled to the one or more memories, the one or more processors individually or collectively configured to cause the device to perform the method of one or more of Aspects 1-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a processing system that includes one or more processors and one or more memories coupled with the one or more processors, the processing system configured to cause the UE to:

receive a configuration that indicates a condition for updating an on-demand system information block (OD-SIB) in association with mobility of the UE, wherein the condition includes the UE moving from coverage of a first non-anchor cell to coverage of a second non-anchor cell; and receive, from an anchor cell on a first carrier frequency and based at least in part on the condition, an update associated with the OD-SIB, wherein the second non-anchor cell is on a second carrier frequency, and wherein the second non-anchor cell is associated with the anchor cell.

2. The UE of claim 1, wherein the OD-SIB comprises cell access related information.

3. The UE of claim 1, wherein a coverage area of the second non-anchor cell is included in a coverage area of the anchor cell.

4. The UE of claim 1, wherein the processing system is further configured to cause the UE to receive paging downlink control information (DCI) that comprises an indication of the update.

5. The UE of claim 4, wherein the indication comprises a system information modification bit of a short message of the paging DCI.

6. The UE of claim 4, wherein the paging DCI comprises an on-demand system information modification bit for the second non-anchor cell, and wherein the indication is separate from a system information modification bit for the anchor cell.

7. The UE of claim 1, wherein the processing system is further configured to cause the UE to receive an indication of the update on a paging occasion associated with UEs that support the OD-SIB.

8. The UE of claim 1, wherein the processing system is further configured to cause the UE to receive a value tag associated with a SIB, from the anchor cell, that carries an OD-SIB cell configuration associated with the OD-SIB.

9. The UE of claim 1, wherein the processing system is further configured to cause the UE to receive a value tag associated with the OD-SIB of the second non-anchor cell.

10. The UE of claim 1, wherein the update associated with the OD-SIB comprises an update of an OD-SIB cell configuration associated with the OD-SIB.

11. The UE of claim 10, wherein, to cause the UE to receive the update, the processing system is configured to cause the UE to receive the update via a SIB for OD-SIB cell configuration transmitted from the anchor cell.

12. The UE of claim 1, wherein the update associated with the OD-SIB comprises an update of the OD-SIB transmitted from the second non-anchor cell.

13. The UE of claim 1, wherein the processing system is further configured to cause the UE to receive an indication of an update associated with a second OD-SIB of a third non-anchor cell on a third carrier frequency.

14. The UE of claim 13, wherein the indication comprises a separate on-demand system information modification bit of a paging downlink control information.

15. The UE of claim 13, wherein the indication comprises a separate value tag of a SIB associated with the second OD-SIB.

16. The UE of claim 1, wherein the processing system is further configured to cause the UE to request, from the second non-anchor cell, an OD-SIB transmission to update the OD-SIB.

17. The UE of claim 1, wherein, to cause the UE to receive the update, the processing system is configured to cause the UE to receive the update in a next OD-SIB modification period after reception of an indication associated with the update.

18. The UE of claim 1, wherein the processing system, to cause the UE to receive the update, is configured to cause the UE to receive the update in association with moving from coverage of a first anchor cell to coverage of a second anchor cell, wherein the second anchor cell is the anchor cell.

19. The UE of claim 1, wherein the processing system, to cause the UE to receive the update, is configured to cause the UE to receive the update in association with moving from coverage of a first anchor cell associated with a first cell group identifier to coverage of a second anchor cell associated with a second cell group identifier, wherein the second anchor cell is the anchor cell.

20. A network node for wireless communication, comprising:

a processing system that includes one or more processors and one or more memories coupled with the one or more processors, the processing system configured to cause the network node to:

transmit a configuration that indicates a condition for updating an on-demand system information block (OD-SIB) in association with mobility of a user equipment (UE), wherein the condition includes the UE moving from coverage of a first non-anchor cell to coverage of a second non-anchor cell; and transmit, via an anchor cell on a first carrier frequency and based at least in part on the condition, an update associated with the OD-SIB, wherein the second non-anchor cell is on a second carrier frequency, and wherein the second non-anchor cell is associated with the anchor cell.

21. The network node of claim 20, wherein the OD-SIB comprises cell access related information.

22. The network node of claim 20, wherein a coverage area of the second non-anchor cell is included in a coverage area of the anchor cell.

23. The network node of claim 20, wherein the processing system is further configured to cause the network node to transmit paging downlink control information (DCI) that comprises an indication of the update.

24. The network node of claim 23, wherein the indication comprises a system information modification bit of a short message of the paging DCI.

25. The network node of claim 23, wherein the paging DCI comprises an on-demand system information modification bit for the second non-anchor cell, and wherein the indication is separate from a system information modification bit for the anchor cell.

26. A method of wireless communication by a user equipment (UE), comprising:

receiving a configuration that indicates a condition for updating an on-demand system information block (OD-SIB) in association with mobility of a user equipment (UE), wherein the condition includes the UE moving from coverage of a first non-anchor cell to coverage of a second non-anchor cell; and receiving, from an anchor cell on a first carrier frequency and based at least in part on the condition, an update associated with the OD-SIB, wherein the second non-anchor cell is on a second carrier frequency, and wherein the second non-anchor cell is associated with the anchor cell.

27. The method of claim 26, wherein the update is received in association with moving from coverage of a first anchor cell to coverage of a second anchor cell, wherein the second anchor cell is the anchor cell.

28. The method of claim 26, wherein the update is received in association with moving from coverage of a first anchor cell associated with a first cell group identifier to coverage of a second anchor cell associated with a second cell group identifier, wherein the second anchor cell is the anchor cell.

29. A method of wireless communication by a network node, comprising:

transmitting a configuration that indicates a condition for updating an on-demand system information block (OD-SIB) in association with mobility of the UE, wherein the condition includes the UE moving from coverage of a first non-anchor cell to coverage of a second non-anchor cell; and transmitting, via an anchor cell on a first carrier frequency and based at least in part on the condition, an update associated with the OD-SIB, wherein the second non-anchor cell is on a second carrier frequency, and wherein the second non-anchor cell is associated with the anchor cell.

30. The method of claim 29, wherein the OD-SIB comprises cell access related information.

* * * * *